United States Patent
Tokushima et al.

(10) Patent No.: US 11,137,546 B2
(45) Date of Patent: Oct. 5, 2021

(54) OPTICAL ELEMENT

(71) Applicants: NEC Corporation, Tokyo (JP);
Photonics Electronics Technology Research Association, Tokyo (JP)

(72) Inventors: Masatoshi Tokushima, Tokyo (JP);
Jun Ushida, Tokyo (JP)

(73) Assignees: NEC Corporation, Tokyo (JP);
Photonics Electronics Technology Research Association, Tokyo (JP)

(*) Notice: Subject to any disclaimer, the term of this patent is extended or adjusted under 35 U.S.C. 154(b) by 0 days.

(21) Appl. No.: 16/788,756

(22) Filed: Feb. 12, 2020

(65) Prior Publication Data

US 2020/0264375 A1    Aug. 20, 2020

(30) Foreign Application Priority Data

Feb. 15, 2019 (JP) .............................. JP2019-025235

(51) Int. Cl.

| | |
|---|---|
| G02B 6/12 | (2006.01) |
| G02B 6/125 | (2006.01) |
| G02B 6/28 | (2006.01) |
| G02B 6/293 | (2006.01) |
| G02B 6/30 | (2006.01) |
| G02B 6/34 | (2006.01) |
| G02B 6/42 | (2006.01) |

(52) U.S. Cl.
CPC ..... *G02B 6/29344* (2013.01); *G02B 6/29338* (2013.01); *G02B 6/29311* (2013.01)

(58) Field of Classification Search
CPC ............ G02B 6/29344; G02B 6/29388; G02B 6/29311; G02B 6/29347; G02B 6/2813; G02B 6/12007; G02B 6/125; G02B 6/4225; G02B 6/34; G02B 6/305

See application file for complete search history.

(56) References Cited

U.S. PATENT DOCUMENTS

| | | | |
|---|---|---|---|
| 7,024,066 B1 | 4/2006 | Malendevich et al. | |
| 7,183,759 B1 | 2/2007 | Malendevich et al. | |
| 7,184,626 B1 | 2/2007 | Gunn, III et al. | |
| 7,224,174 B1 | 5/2007 | Malendevich et al. | |
| 7,262,852 B1 | 8/2007 | Gunn, III et al. | |
| 7,298,939 B1 | 11/2007 | Malendevich et al. | |
| 7,378,861 B1 | 5/2008 | Malendevich et al. | |
| 7,412,138 B1 | 8/2008 | Malendevich et al. | |
| 7,586,608 B1 | 9/2009 | Gunn, III et al. | |
| 8,422,530 B2* | 4/2013 | Yoon | H01S 5/026 372/94 |
| 8,699,836 B2* | 4/2014 | Doerr | G02B 6/124 385/37 |
| 8,818,203 B2* | 8/2014 | Ji | G02F 1/225 398/182 |
| 9,562,852 B1* | 2/2017 | Barwicz | G01J 3/0218 |

(Continued)

*Primary Examiner* — Ryan A Lepisto
(74) *Attorney, Agent, or Firm* — Finnegan, Henderson, Farabow, Garrett & Dunner, L.L.P.

(57) ABSTRACT

To provide an optical element that can be more easily aligned with an optical fiber, an optical element includes one grating coupler optically coupled to an optical fiber, a waveguide connected to the grating coupler, a multimode interferometer connected to the waveguide on the opposite side to the grating coupler, and a waveguide inserted between two input/output ports on the branched side of the multimode interferometer.

7 Claims, 19 Drawing Sheets

(56) References Cited

U.S. PATENT DOCUMENTS

| | | | |
|---|---|---|---|
| 9,615,152 B2* | 4/2017 | Jeong | H04B 10/0795 |
| 9,715,066 B2* | 7/2017 | Ryckman | G02B 6/26 |
| 9,941,975 B2* | 4/2018 | Tanaka | G02B 6/124 |
| 2016/0246009 A1* | 8/2016 | Jiang | G02B 6/124 |

* cited by examiner

OPTICAL ELEMENT

INCORPORATION BY REFERENCE

This application is based upon and claims the benefit of priority from Japanese patent application No. 2019-025235, filed on Feb. 15, 2019, the disclosure of which is incorporated herein in its entirety by reference.

TECHNICAL FIELD

The present disclosure relates to an optical element.

BACKGROUND ART

Optical integrated circuit technology is making substantial progress with the recent development of silicon photonics. Silicon photonics is a technology that forms, on a wafer, various individual photonic device elements that make silicon (Si) serve as a core of a waveguide, or an optical circuit or a high-density optical integrated circuit combining those device elements. Using silicon photonics for the manufacture of photonic devices has a significant advantage in being able to make use of a mature CMOS (Complementary Metal Oxide Semiconductor) process technology or leading-edge CMOS process technology.

Note that, unless otherwise specified, a semiconductor chip equipped with photonic devices manufactured using silicon photonics is referred to hereinafter as "photonic chip", or simply "chip".

In general, a photonic chip is optically coupled to an optical fiber and thereby inputs and outputs optical signals from and to the outside. The diameter of a light beam that propagates through a waveguide included in the photonic chip and having a silicon core (which is hereinafter referred to simply as "silicon waveguide"), or the diameter of a guided mode, is approximately 0.5 μm. On the other hand, the diameter of a guided mode of a commonly used single-mode fiber (SMF) is approximately 10 μm. Because the diameter of the guided mode of a waveguide on a photonic chip is very different from that of an SMF, efficient optical coupling cannot be achieved by merely coupling them directly. Therefore, optical couplers are often formed at input and output ends of the waveguide on the photonic chip. The optical coupler converts the guided mode of the waveguide on the photonic chip to the optical fiber and vice versa to eliminate the difference in the mode diameters, and thereby enhancing the optical coupling efficiency.

Broadly speaking, there are two types of optical couplers: an end coupling type and a surface coupling type. An optical coupler of the end coupling type is also called a spot-size converter (SSC) in some cases. On the other hand, an optical coupler of the surface coupling type can be an optical coupler with a 45° mirror, a grating coupler (GC) or the like. Particularly, the GC is often used for recent silicon photonic chips. The grating coupler can output signal light processed by a photonic integrated circuit in a photonic chip, nearly vertically to the surface of the photonic chip. Then, by butt-coupling an optical fiber with the grating coupler along the optical axis of the output light, the signal light can be input to the optical fiber. On the other hand, by irradiating the grating coupler with signal light transmitted through the optical fiber, the signal light can be input to an optical circuit in the photonic chip.

The grating coupler uses a light diffraction phenomenon caused by grating in order to deflect the propagating direction of signal light at approximately 90°. Thus, it has a disadvantage that the wavelength dependence and the polarization dependence are high. However, the advantage that layout flexibility on a chip increases by being small and of the surface coupling type overcomes this disadvantage, and therefore it has been more often used in photonic chips than the optical coupler of the end coupling type recently.

There is another advantage of the grating coupler being an optical coupler of the surface coupling type. For example, the grating coupler does not need a chip end surface for inputting and outputting light. This enables us to perform optical measurement of a photonic device or the like formed on a wafer before the wafer is diced into chips. Such measurement in the form of a wafer is called wafer-level test or wafer-level testing. The wafer-level test, as referred to herein, includes a test carried out after some processing has been made such as a wafer-level CSP (Chip-Scale Package), in which each chip is packaged in a wafer level. While wafer-level tests are generally performed for semiconductor chips of electronic devices, the practical use of wafer-level tests for semiconductor chips of photonic devices was promoted only after the grating coupler became popular optical couplers for the semiconductor chips of photonic devices. However, not all of optical tests can be performed as wafer-level tests. On the development stage or the defect analysis stage of a photonic chip, it is often necessary to measure photonic devices after cutting into chips (dicing) has been done. In such cases, a chip-level test is carried out.

In any of wafer-level and chip-level tests, the operation or optical test (optical measurement) of a photonic device starts with optically aligning a light-condensing optical system that includes an optical fiber or a lens with an optical coupler of the photonic device. For example, in a photonic device equipped with a grating coupler, optical alignment of an optical fiber with the grating coupler is carried out as one step of a test process. However, the optical coupling efficiency is not necessarily the maximum when the optical fiber is mechanically placed at the optimum position calculated based on the design of the grating coupler. Therefore, adjustment of the alignment position is often carried out in order to maximize the intensity of an optical response signal. This operation is called active alignment. Although only an optical measurement procedure was described above for simplicity, the same applies when a photonic device (optical element) works for other purposes than measurement. This way of explanation applies also in the following description.

Most of individual photonic device elements constituting a photonic device are passive devices. Therefore, the most fundamental optical measurement of a photonic device is that light is input from the outside to the photonic device and transmitted through it and that the output light is detected for measuring its differences from the input light as responses of the photonic device. For example, differences in light intensity and polarization are measured at varying wavelengths. Changes in wavelength themselves are measured in some cases. In any case, for optical measurement, a photonic device (optical element) to be measured needs to simultaneously have optical couplers for each of light input and light output. For example, U.S. Pat. Nos. 7,224,174, 7,586,608, 7,412,138, 7,378,861, 7,298,939, 7,262,852, 7,184,626, 7,183,759 and 7,024,066 disclose the structure of a photonic device according to a background art related to the present disclosure (which is hereinafter referred to simply as "related").

FIG. 10 is a plan view showing an example of a related optical element 500 (photonic device for measurement). The optical element 500 includes grating couplers 501 and 502 as optical couplers, and a waveguide 503. The grating coupler 501 and the grating coupler 502 are simply connected by the waveguide 503. FIG. 11 is a perspective view showing an example of measurement of the optical element 500. To be specific, FIG. 11 is a perspective view of the optical element 500 of FIG. 10 viewed from obliquely above. An optical fiber 200A is aligned with the grating coupler 501, and an optical fiber 200B is aligned with the grating coupler 502. For example, when light is input from the optical fiber 200A to the grating coupler 501 in a first direction D9, the light propagates through the waveguide 503 in a second direction D10, and is output from the grating coupler 502 to the optical fiber 200B in a third direction D11. In this manner, the related optical element 500 is a 2-port device having two optical couplers for light input and output. Specifically, measurement is performed by optically coupling two external optical systems, such as the optical fibers 200A and 200B, simultaneously to the grating couplers 501 and 502, which are two ports of the optical element 500 being a 2-port device.

FIGS. 12A and 12B show plan views of an optical element 500A and an optical element 500B, respectively, which are different only in the length of waveguides 503A and 503B. The two optical elements 500A and 500B having different lengths of the waveguides 503A and 503B are placed on a wafer or a chip, the transmission spectrum of each element is measured, and the difference between the measured spectra is calculated. Then, a transmission loss, or a propagation loss corresponding to the difference of the waveguide lengths is obtained, which is the remaining optical loss left after subtracting the optical coupling losses of the grating couplers 501 and 502 and the propagation loss of the shorter waveguide 503A. It is thereby possible to measure the wavelength dependence of the transmittance (transmission spectrum) of the waveguide 503 as a device element, for example. Note that, virtually, a characterization target (characterized device element) is the waveguide 503 inserted between the grating couplers 501 and 502, which are two input and output ports.

The characterization-target device element which is inserted between the two grating couplers 501 and 502 is not limited to the waveguide 503. Although only the waveguide 503 is inserted between the two grating couplers 501 and 502 for light input and output of an optical element 500C in FIG. 13A, a ring resonator 300 is inserted between the two grating couplers 501 and 502 of an optical element 500D in FIG. 13B. The transmission spectrum of only the ring resonator can be obtained by measuring the transmission spectra of the optical element 500C and the optical element 500D and calculating the difference between them. In this manner, the characterization target is basically an optical circuit placed between two ports, and it may be a waveguide or another photonic device element, or may be a more complicated optical circuit. The term "optical circuit" as referred to below includes a waveguide or another photonic device element.

In the above-described related technical field, an optical element is generally a 2-port device as a whole, and optical coupling between an external optical system such as an optical fiber and an optical coupler such as a grating coupler needs to be made simultaneously at two points. Then, for accurate and stable measurement, it is necessary to make alignment in such a way that high optical-coupling-efficiencies for both of the two optical couplers are achieved. However, significantly higher alignment accuracy is required when making alignment simultaneously for two optical couplers than when making alignment for one optical coupler.

FIG. 14A shows a situation in which two optical fibers 200A and 200B are coupled to the optical element 500. The optical fiber 200A is coupled to the grating coupler 501, and the optical fiber 200B is coupled to the grating coupler 502. As shown in FIG. 14A, in order to accurately align the optical fibers 200A and 200B with the respective grating couplers 501 and 502, the optical axis distance between the two grating couplers 501 and 502 and the optical axis distance between the two optical fibers 200A and 200B need to be the same. However, the distance between grating couplers is typically one to several hundreds of μm in an integrated photonic chip, and it is difficult to place two single-core optical fibers at such close positions to each other.

Thus, in often cases, an arrayed fiber is coupled to two grating couplers. The arrayed fiber is a multicore optical fiber formed by arranging two or more single-core optical fibers at a predetermined distance from one another and by aligning and polishing the end faces of the optical fibers at a certain angle. However, there are cases where the distance between the optical axes of the two optical fibers included in the arrayed fiber and the distance between the optical axes of the grating couplers of the optical element are slightly different due to a manufacturing error or the like. When this difference in distance is large, the two optical fibers cannot be accurately aligned with the respective corresponding grating couplers simultaneously. This is likely to occur particularly when the distance between the grating couplers, which are the optical couplers, is large.

Furthermore, as shown in FIG. 14B, even when the distance between the optical fibers and the distance between the grating couplers are the same, the arrayed fiber cannot be accurately aligned with the two grating couplers simultaneously if the rotation angle of the arrayed fiber in the wafer surface or in the chip surface is different from the rotation angle of the optical element.

The same problem can occur for the height direction. FIG. 15A is a side view along line A1-A2 in a plan view of the optical element 500 shown in FIG. 15B, and it shows a situation in which the optical fibers 200A and 200B are optically coupled to the grating couplers 501 and 502, respectively. The two optical fibers 200A and 200B form an arrayed fiber. However, because this arrayed fiber is tilted in the plane perpendicular to the incidence planes of the grating couplers 501 and 502, an end face 201B of the optical fiber 200B cannot be sufficiently close to the grating coupler 502. In other words, parallelism in the height direction is not achieved. This occurs when parallelism of the surface of a wafer to be measured or a photonic chip to be measured and the end face of an arrayed fiber is not sufficiently achieved. Particularly, when performing a wafer test, it is difficult to observe the coupled part of the grating coupler and the optical fiber from the side as shown in FIG. 15A due to the placement of a camera for observation, and it is difficult to make an accurate adjustment of the rotation angle.

As described above, an optical element generally includes two optical couplers (which are grating couplers in the above-described example) for light input and output, and it is not possible to perform accurate measurement for the optical element unless accurate alignment is achieved at both of the optical couplers. Therefore, in the case of using an optical element, it is necessary to use an arrayed fiber with high manufacturing accuracy and also achieve high parallelism between the arrayed fiber and a wafer to be measured or a photonic chip to be measured in both of the in-plane direction and the height direction before measurement. However, a measuring apparatus capable of achieving high parallelism is larger and more expensive than an apparatus with no such function, and furthermore the entire measuring time significantly increases because an alignment procedure takes time. In addition, in the case of a diced photonic chip, the chip is so small that it is technically difficult to achieve high parallelism.

SUMMARY

An object of the present disclosure is to provide an optical element that can be more easily aligned with an optical fiber.

An optical element according to a first aspect of the present disclosure includes one optical coupler, a first waveguide connected to the optical coupler, an optical circuit including at least two input/output ports, the optical circuit being connected to an end of the first waveguide opposite to an end thereof to which the optical coupler is connected, a second waveguide connected to one of the input/output ports of the optical circuit different from the other one of the input/output ports connected to the first waveguide, a beam splitter connected to an end of the second waveguide opposite to an end thereof to which the optical circuit is connected, and a third waveguide configured to be inserted between two input/output ports disposed on a branched side of the beam splitter.

An optical element according to a second aspect of the present disclosure includes one optical coupler, a first waveguide connected to the optical coupler, a beam splitter connected an end of the first waveguide opposite to an end thereof to which the optical coupler is connected, a second waveguide connected to one of two input/output ports disposed on a branched side of the beam splitter, a third waveguide connected to the other one of the two input/output ports disposed on the branched side of the beam splitter, and an optical circuit configured to be inserted between the second waveguide and the third waveguide and include at least two input/output ports, wherein an end of the second waveguide opposite to an end thereof to which the beam splitter is connected is connected to one of the input/output ports of the optical circuit, and an end of the third waveguide opposite to an end thereof to which the beam splitter is connected is connected to the other one of the input/output ports of the optical circuit different from the input/output port connected to the second waveguide.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Embodiments of the present disclosure are described hereinafter with reference to the drawings. Note that, however, the technical scope of the present disclosure is not limited to the embodiments described below and should be interpreted based on the description in the scope of the present disclosure.

First Embodiment

Figure 1:
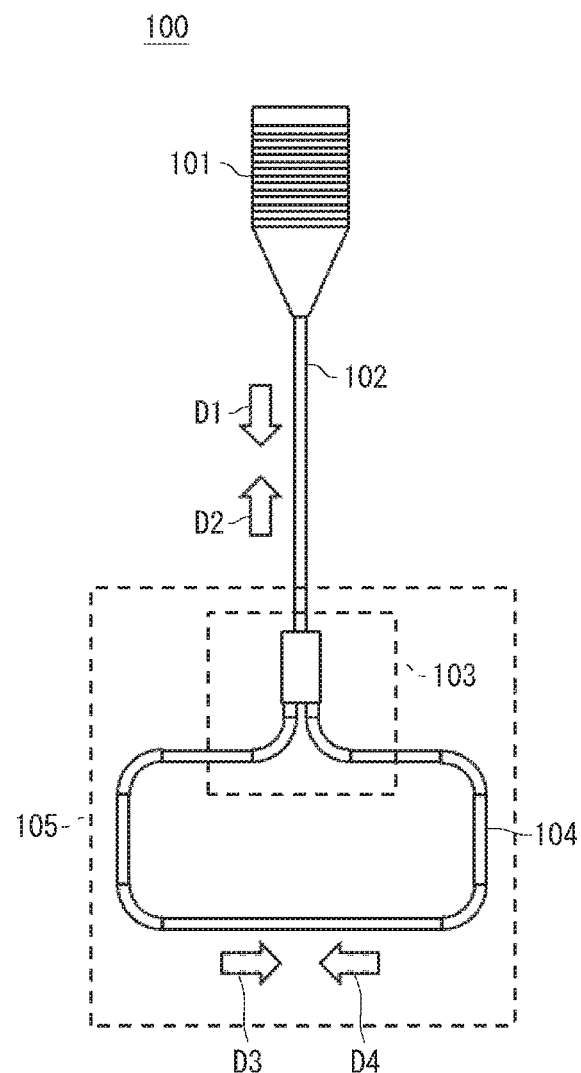
FIG. 1 is a plan view showing an optical element according to a first embodiment of the present disclosure.

FIG. 1 is a plan view showing an example of an optical element 100 according to a first embodiment of the present disclosure. The optical element 100 is an optical element mounted on a wafer or a chip.

As shown in FIG. 1, the optical element 100 includes a grating coupler 101 as one optical coupler, a waveguide 102 as a first waveguide, an optical circuit and a second waveguide, a multi-mode interferometer (MMI) 103 as a beam splitter, a waveguide 104 as a third waveguide and the like.

The grating coupler 101 is connected to one end of the waveguide 102. The multi-mode interferometer 103 is connected to the other end of the waveguide 102. Thus, the waveguide 102 is placed between the grating coupler 101 and the multi-mode interferometer 103. While an example in which the first waveguide, the optical circuit and the second waveguide are formed as one waveguide 102 is described in the first embodiment, the first waveguide, the optical circuit and the second waveguide may be formed as separate components. For example, the optical circuit having at least two ports may be connected between the first waveguide connected to the grating coupler 101 and the second waveguide connected to the multi-mode interferometer 103.

The multi-mode interferometer 103 is a 1-input 2-output multimode interferometer (1×2 multimode interferometer). The multi-mode interferometer 103 is a two-output-port beam splitter, and the waveguide 104 is inserted between the two input/output ports on the branched side of the multi-mode interferometer 103.

In other words, the grating coupler 101 functions as a light input/output unit for inputting and outputting light to be measured, and the multi-mode interferometer 103 and the waveguide 104 form a loop-back light reflection unit 105. Then, the waveguide 102 as a characterization-target device element is placed in a path between the grating coupler 101 and the light reflection unit 105.

Figure 2:
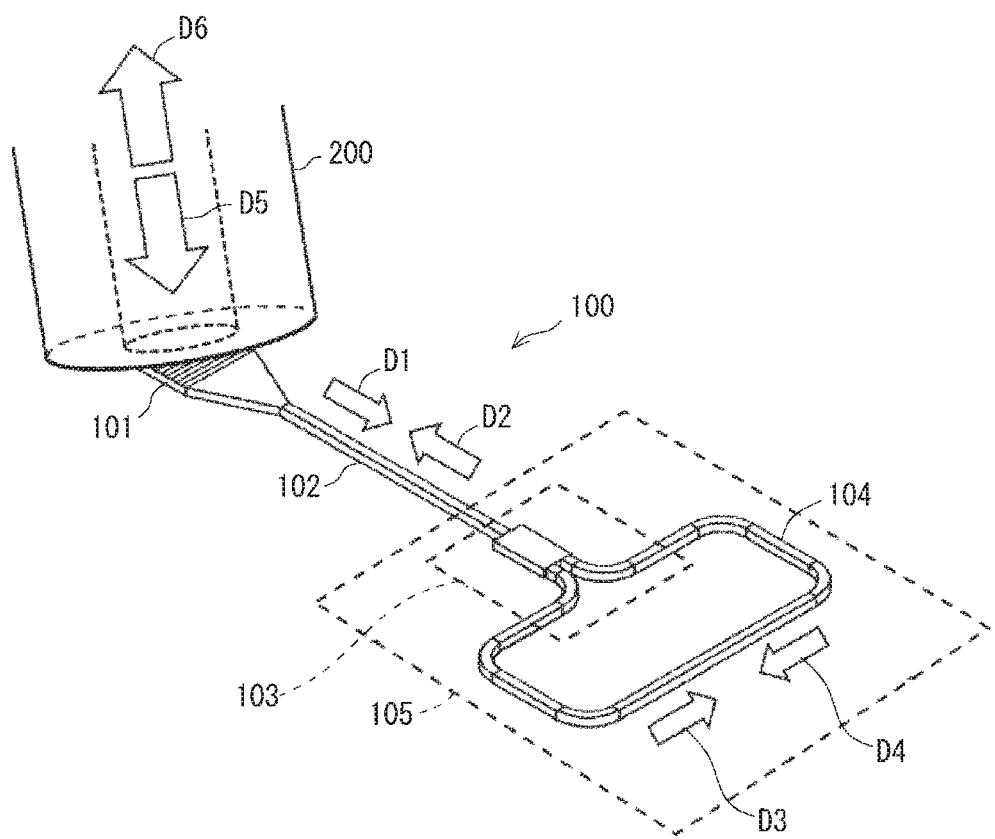
FIG. 2 is a perspective view showing the state where an optical fiber is optically coupled to the optical element according to the first embodiment of the present disclosure.

FIG. 2 shows the state where an optical fiber 200 is optically coupled to the optical element 100 according to the first embodiment. As shown in FIG. 2, the end face of the optical fiber 200 is brought close to the grating coupler 101 in such a way that the optical axis of the optical fiber 200 coincides with the optical axis of the grating coupler 101. The grating coupler 101 is thereby aligned with the optical fiber 200 in such a way that the optical coupling efficiency reaches its maximum. If the optical coupler is the grating coupler 101, the optical axis of the grating coupler 101 will be tilted at a certain angle (for example, 8°) vertically to a wafer surface or a chip surface on which the optical element 100 is formed, and accordingly the optical fiber 200 is also tilted at the same angle.

The operation of the optical element 100 is described hereinafter with reference to FIG. 2. Light that has propagated through the optical fiber 200 in a direction D5 is output from the end face of the optical fiber 200 and input to the grating coupler 101. The input light is diffracted by grating of the grating coupler 101 and is input to the waveguide 102, propagates in a direction D1, and input to the multi-mode interferometer 103. The multi-mode interferometer 103 operates as a beam splitter, and splits the input light into light beams of the same power. The two split light beams are input to the waveguide 104 in opposite directions to each other. One light beam propagates through the waveguide 104 in a direction D3, and the other light beam propagates through the waveguide 104 in a direction D4. The two propagating light beams that have propagated through the waveguide 104 return to the multi-mode interferometer 103. The multi-mode interferometer 103 performs an operation that is inverse to the beam splitter and thereby serves as an optical beam combiner. The light beam combined by the multi-mode interferometer 103 propagates through the waveguide 102 in a direction D2 and is input to the grating coupler 101. The grating coupler 101 diffracts this light and outputs it upward, so that the light is input to the optical fiber 200. The light input to the optical fiber 200 propagates in a direction D6.

In other words, the light that propagates through the optical fiber 200 in the direction D5 is light to be input to the optical element 100, and the light that propagates through the optical fiber 200 in the direction D6 is light output from the optical element 100. Thus, a probe of an external optical system required to measure the optical element 100 is only one: the optical fiber 200. This allows the optical fiber 200 to be more easily aligned with the grating coupler 101 of the optical element 100. Specifically, because the tolerance for rotational deviation in the wafer plane or in the chip plane and the tolerance for rotational deviation in the height direction are higher than the case of using the related optical element 500 shown in FIG. 10, it is possible to measure the optical element 100 simply with a general-purpose optical measuring system having the single-core optical fiber 200. Furthermore, because there is no need to simultaneously perform optical coupling at positions in close proximity to each other, it is possible to build an optical measuring system having a light condensing optical system with a lens, which is difficult to be sufficiently reduced in size. Being able to use an optical system having a lens eliminates the need to use an arrayed fiber, which is fragile and prone to be stained at the end face and significantly facilitates the calibration of the measuring system.

The output light of the optical element 100 that returns through the optical fiber 200 is reflected return light from the optical element 100. To input this reflected return light to various measuring instruments such as an optical power meter or a spectral analyzer, an optical circulator or the like can be used. The optical circulator typically includes three input/output terminals. Assume that the three input/output terminals are ports 1, 2 and 3, respectively. Then, for example, light output from a light source is input to the port 1 of the optical circulator, and this light is output from the port 2 and then input to the grating coupler 101 of the optical element 100 through the optical fiber 200 connected to the port 2. In this case, the output light from the optical element 100 propagates reversely through the same optical fiber 200, returns to the port 2 of the optical circulator, and is output from the port 3. If the output light from the port 3 is fed into an optical power meter, a spectral analyzer or the like, for example, it is possible to measure the optical loss of the optical element 100 or its wavelength spectrum. In this manner, by using the optical circulator, it is possible to cancel out the wavelength characteristics of elements other than the characterization-target device element included in the optical element 100. To be specific, the wavelength characteristics of the measuring system, the wavelength characteristics of an optical coupling loss between the grating coupler 101 and the optical fiber 200, or the wavelength characteristics of the beam splitter (beam combiner) included in the optical element 100 are canceled out by calculating differences. It is thereby possible to know the optical characteristics of the characterization-target device element only.

In the optical element 100 according to the first embodiment, there are two positions to which the characterization-target device element can be inserted. One is a path between the grating coupler 101 as the optical coupler and the multi-mode interferometer 103 as the beam splitter in the optical element 100. The other one is a path between two input/output ports on the branched side of the multi-mode interferometer 103 as the beam splitter. The optical element 100 shown in FIGS. 1 and 2 has a structure where a path to which the characterization-target device element can be inserted is the waveguides 102 and 104 as the simplest case. Note that the waveguides 102 and 104 may serve as the characterization-target device element.

FIGS. 3 and 4 show examples in which the characterization-target device element is inserted to the path between the grating coupler 101 as the optical coupler and the multi-mode interferometer 103 as the beam splitter in the optical element 100. However, the characterization-target device element shown in FIGS. 3 and 4 may be inserted to the path between the two input/output ports on the branched side of the multi-mode interferometer 103 as the beam splitter.

Figure 3A:
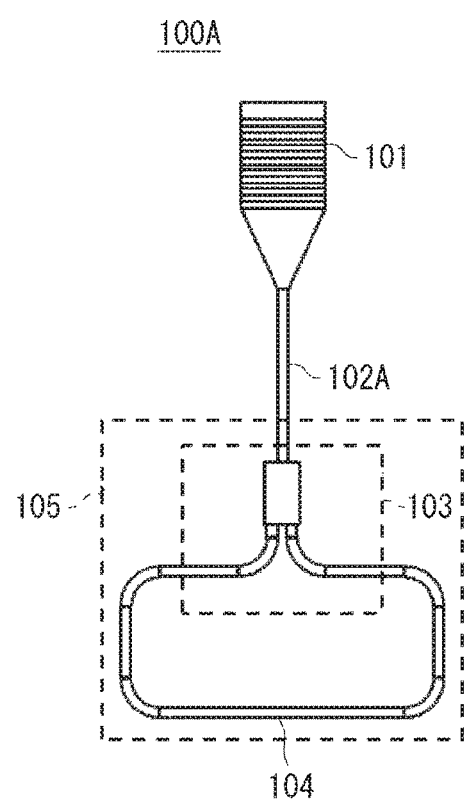
FIG. 3A is a plan view illustrating an example 1 using the optical element according to the first embodiment of the present disclosure.
Figure 3B:
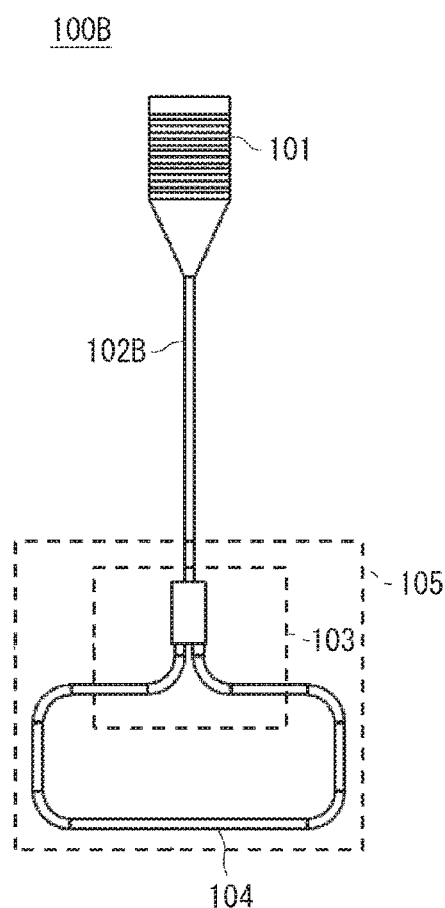
FIG. 3B is a plan view illustrating an example 1 using the optical element according to the first embodiment of the present disclosure.

First, an example 1 using the optical element 100 according to the first embodiment is described hereinafter with reference to FIG. 3. An optical element 100A shown in FIG. 3A and an optical element 100B shown in FIG. 3B are different only in the length between a waveguide 102A and a waveguide 102B. Thus, the optical characteristics of the waveguide with a length that is twice the length corresponding to the difference between the waveguide 102A and the waveguide 102B can be obtained by performing measurement on the optical element 100A and the optical element 100B under the same measurement conditions and calculating a difference between these two measurement results.

Figure 4A:
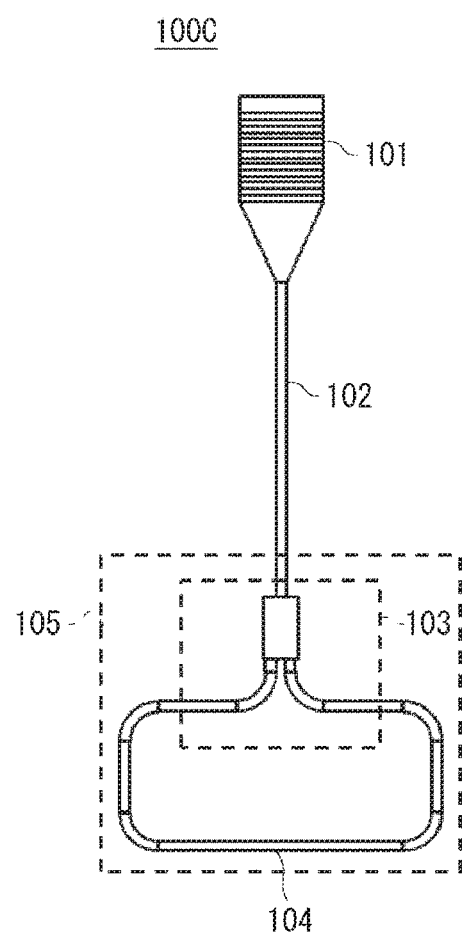
FIG. 4A is a plan view illustrating an example 2 using the optical element according to the first embodiment of the present disclosure.
Figure 4B:
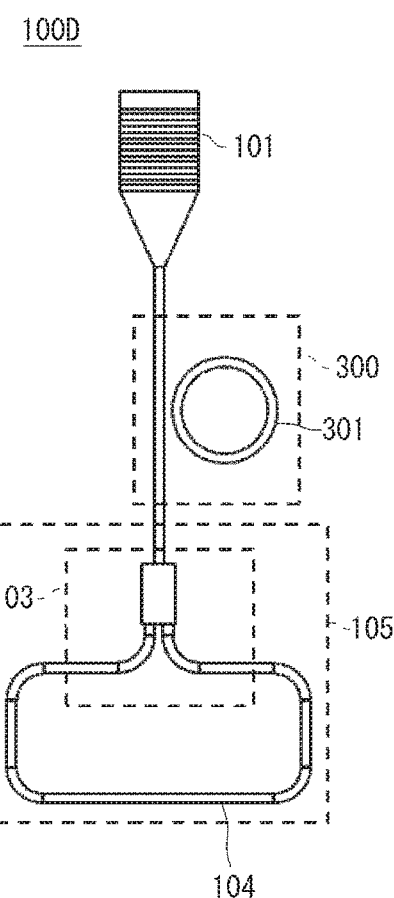
FIG. 4B is a plan view illustrating an example 2 using the optical element according to the first embodiment of the present disclosure.

Next, an example 2 using the optical element 100 according to the first embodiment is described hereinafter with reference to FIG. 4. An optical element 100C shown in FIG. 4A and an optical element 100D shown in FIG. 4B have the waveguide 102 of the same length. On the other hand, a ring waveguide 301 is placed in close proximity to the waveguide 102 of the optical element 100D. The ring waveguide 301 and the waveguide 102 form a ring resonator 300 as the optical circuit. Thus, the optical characteristics similar to those measured for two ring resonators 300 connected in series can be obtained by performing measurement on the optical element 100C and the optical element 100D under the same measurement conditions and calculating a difference between these two measurement results.

To be specific, in the example 1 and the example 2 of the first embodiment, an optical circuit 105 composed of the multi-mode interferometer 103 serving as the beam splitter and the waveguide 104 connecting the two input/output ports on the branched side of the multi-mode interferometer 103 operates as a reflector. In the related optical element 500 shown in FIG. 10, because another optical coupler (e.g., a grating coupler) is placed at a position corresponding to this reflector 105, light transmits through the characterization-target device element only once. On the other hand, in the example 1 and the example 2 of the first embodiment, light that has been input from the grating coupler 101 and transmitted through the characterization-target device element is reflected by the reflector 105 and transmits through the characterization-target device element again in the reverse direction. The light is then output from the grating coupler 101. In this manner, because light transmits through the characterization-target device element twice in the example 1 and the example 2, it is necessary to divide values in dB of the measured transmittance or optical loss by 2 in order to obtain the characteristics when light has transmitted through the characterization-target device element only once. Particularly, when evaluating the propagation loss of the waveguide 102 by using the optical elements 100A and 100B as shown in FIG. 3, there is an advantage that the length of the waveguide 102B of the optical element 100B shown in FIG. 3B can be half the length of the waveguide 102 to be evaluated.

To be further specific, dividing values in dB of the measured transmittance or optical loss by 2 is based on the assumption that the transmission characteristics measured when light transmits through the characterization-target device element in one direction and the transmission characteristics measured when light transmits through the characterization-target device element in a direction opposite to the one direction are equal. To meet this assumption, the characterization-target device element needs to be placed between single-mode waveguides for light having a polarization to be measured. The transmittance between the two single-mode waveguides placed on both sides of the characterization-target device element, thereby, does not depend on the light propagation directions. This is assured by the reciprocity theorem. In a specific structure, the waveguides at the two input/output ports of the characterization-target device element (e.g., the ring waveguide 301) may be both single-mode waveguides, for example. Alternatively, the waveguide (e.g., the waveguide 102) between the optical coupler (e.g., the grating coupler 101) and the characterization-target device element (e.g., the ring waveguide 301) and the waveguide (e.g., the waveguide 102) between the characterization-target device element (e.g., the ring waveguide 301) and the beam splitter (e.g., the multi-mode interferometer 103) may be single-mode waveguides. The characterization-target device element (e.g., the waveguide 102) may be a single-mode waveguide.

Figure 10:
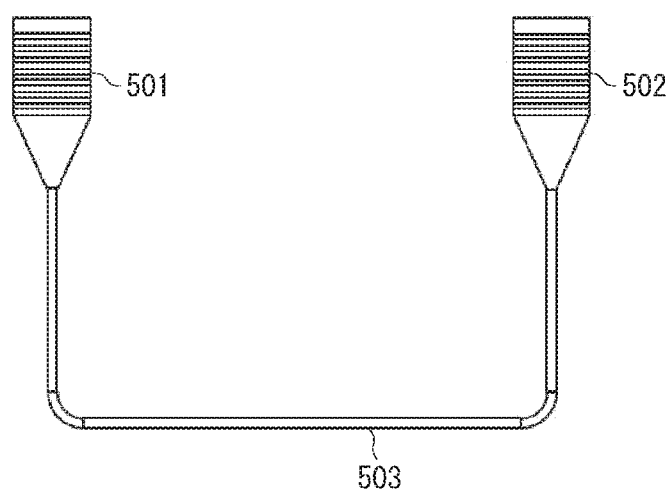
FIG. 10 is a plan view showing a related optical element.
Figure 11:
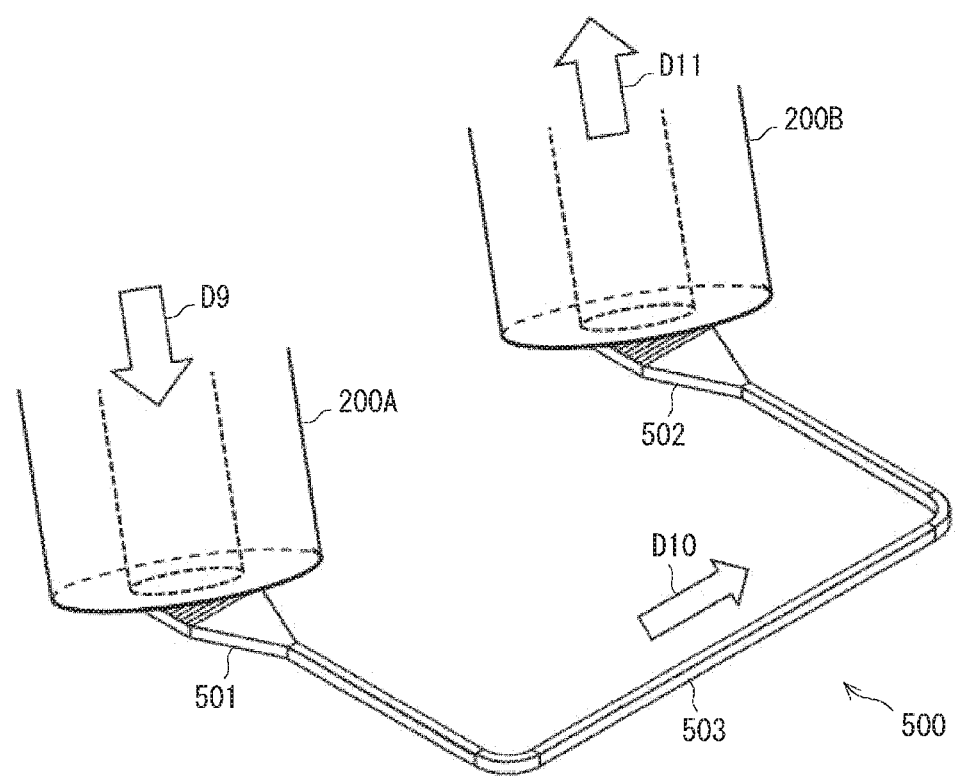
FIG. 11 is a perspective view showing the state where an optical fiber is optically coupled to the optical element shown in FIG. 10.
Figure 12A:
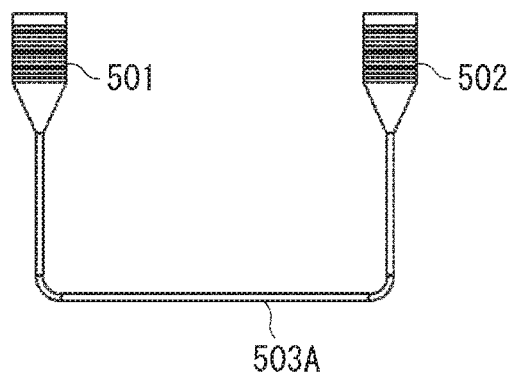
FIG. 12A is a plan view showing two optical elements with different waveguide lengths, each of which is the optical element shown in FIG. 10.
Figure 12B:
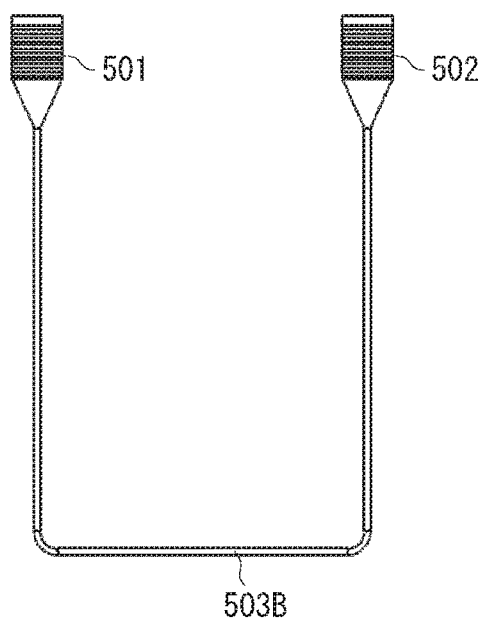
FIG. 12B is a plan view showing two optical elements with different waveguide lengths, each of which is the optical element shown in FIG. 10.
Figure 13A:
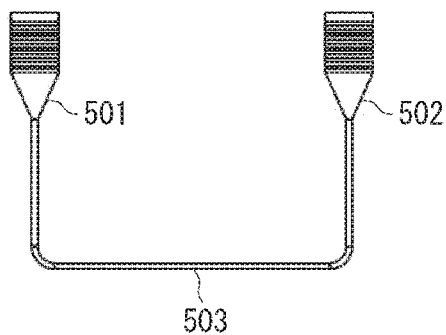
FIG. 13A is a plan view showing an optical element where only a waveguide is connected between two grating couplers.
Figure 13B:
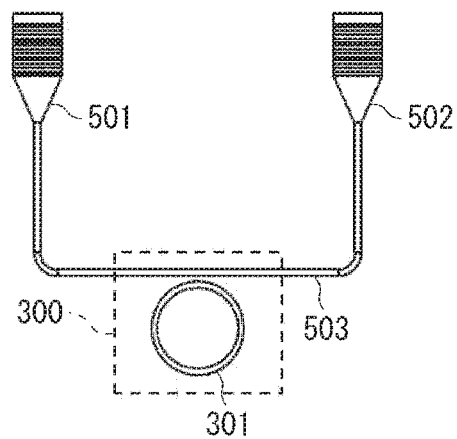
FIG. 13B is a plan view showing an optical element where a waveguide and a ring resonator are connected between two grating couplers each of which is the optical element shown in FIG. 10.
Figure 14A:
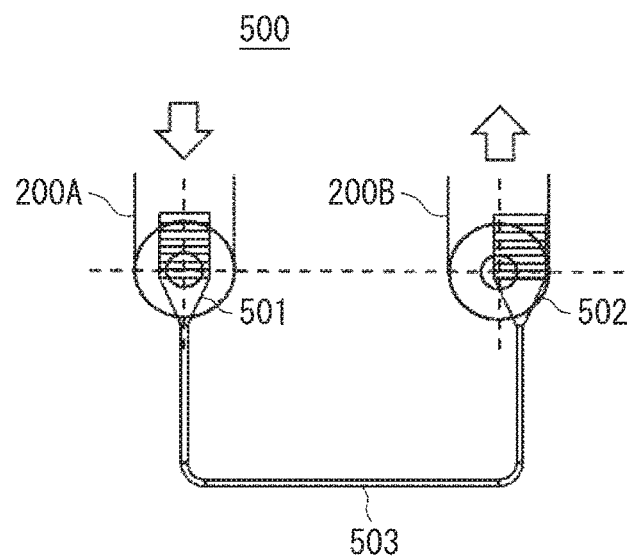
FIG. 14A is a plan view illustrating a difference in distance between grating couplers.
Figure 14B:
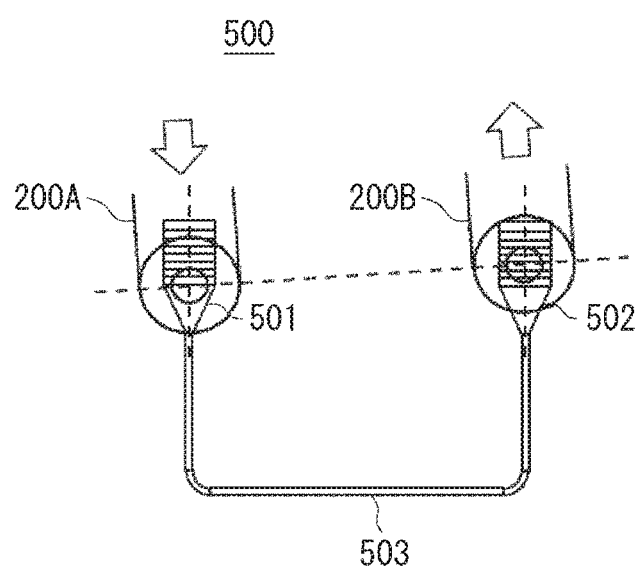
FIG. 14B is a plan view illustrating a difference in rotation angle in a wafer plane or a chip plane, which occur when aligning two optical fibers with two grating couplers of the optical element shown in FIG. 10.
Figure 15A:
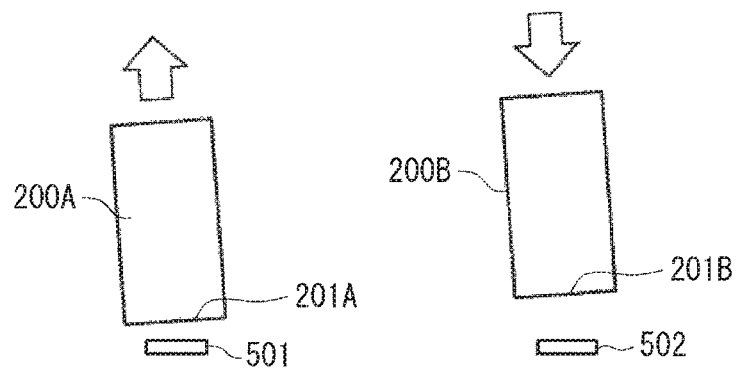
FIG. 15A is a side view illustrating a difference in distance from a wafer surface or a chip surface.
Figure 15B:
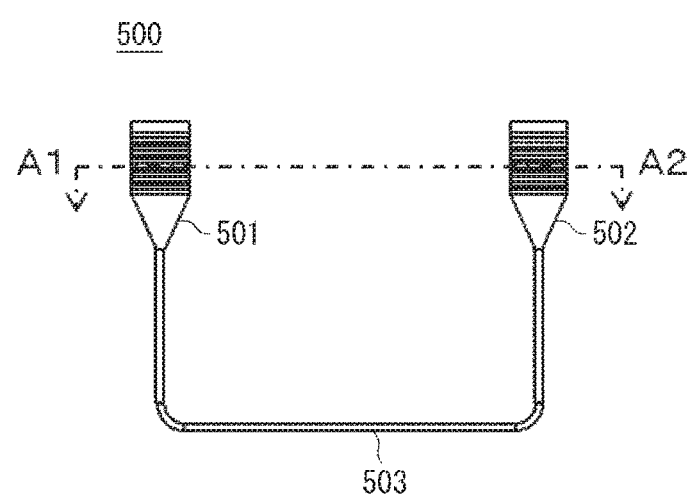
FIG. 15B a plan view viewed from the side of FIG. 15A, which occur when aligning two optical fibers with two grating couplers of the optical element shown in FIG. 10.

Because the optical element 100 according to the first embodiment includes only one optical coupler (the grating coupler 101), it is possible to reduce the size of the external optical system necessary for measurement and optical assembly, compared with the optical element 500 of FIG. 10, which includes two optical couplers. The size of the optical element 100 is also reduced.

In general, the optical element 100 being as small as possible is preferred to for higher degrees of integration. Thus, there is no limit to the demand for size reduction. The smaller the optical element 100 is, the higher the degree of integration of the entire photonic chip is, which enables us to downsize the photonic chip and thereby increase the chip yield from one wafer. A larger number of circuits can be accommodated in the same chip area. The same applies to the optical element 100, and the optical element 100 is more efficient in various aspects as it is smaller in size.

In the optical element 100 according to the first embodiment described above, because the optical element 100 includes one grating coupler 101, a probe of an external optical system required to measure the optical element 100 is only the optical fiber 200. This allows the optical fiber 200 to be more easily aligned with the grating coupler 101 of the optical element 100. It is thereby possible to provide the optical element 100 that can be more easily aligned.

Furthermore, because the waveguides at the two input/output ports of the ring waveguide 301 are both single-mode waveguides, or the waveguide 102 is a single-mode waveguide, the characteristics of the waveguide 102 or the ring resonator 300 can be obtained by dividing a measured value by 2 with the use of the optical elements 100A and 100B.

Furthermore, because the optical element 100 includes the grating coupler 101 as the optical coupler, it is possible to easily manufacture the optical element 100 and perform measurement in a wafer level before dicing. Furthermore, because the optical element 100 includes the multi-mode interferometer 103 as the beam splitter (beam combiner), it has an advantage that the effect of manufacturing errors on the branching ratio of the optical power is smaller compared with the case where it includes a Y-branch waveguide or a directional coupler as the beam splitter (beam combiner).

Second Embodiment

Figure 5:
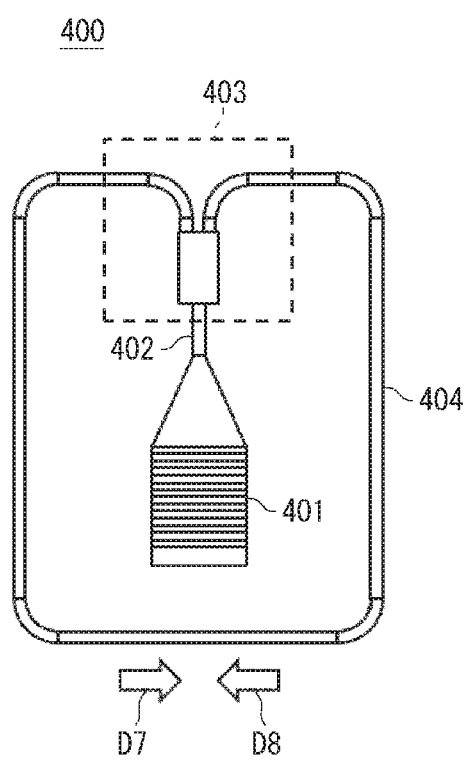
FIG. 5 is a plan view showing an optical element according to a second embodiment of the present disclosure.

FIG. 5 is a plan view showing an example of an optical element 400 according to a second embodiment of the present disclosure. The optical element 400 is an optical element mounted on a wafer or a chip.

As shown in FIG. 5, the optical element 400 includes a grating coupler 401 as one optical coupler, a waveguide 402 as a first waveguide, a multi-mode interferometer (MMI) 403 as a beam splitter, and a waveguide 404 as a second waveguide, an optical circuit and a third waveguide and the like.

The grating coupler 401 is connected to one end of the waveguide 402. The multi-mode interferometer 403 is connected to the other end of the waveguide 402. Thus, the waveguide 402 is placed between the grating coupler 401 and the multi-mode interferometer 403.

The multi-mode interferometer 403 is a two-output-port beam splitter, and the waveguide 404 is inserted between the two input/output ports on the branched side of the multi-mode interferometer 403. In the optical element 400 according to the second embodiment, the grating coupler 401 is placed inside a closed-loop optical circuit formed by the multi-mode interferometer 403 and the waveguide 404. Therefore, in the optical element 400 according to the second embodiment, the region of the closed-loop optical circuit composed of the multi-mode interferometer 403 and the waveguide 404 is more effectively used than in the optical element 100 according to the first embodiment.

Note that, although an example in which the second waveguide, the optical circuit and the third waveguide are formed as one waveguide 404 is described in the second embodiment, the second waveguide, the optical circuit and the third waveguide may be formed as separate components. For example, the optical circuit having at least two ports may be connected between the second waveguide connected to one of the two input/output ports on the branched side of the multi-mode interferometer 403 and the third waveguide connected to the other one of them.

In the second embodiment also, the characterization-target device element may be placed in a path between the grating coupler 401 as the optical coupler and the multi-mode interferometer 403 as the beam splitter. However, if the characterization-target device element is placed between the grating coupler 401 and the multi-mode interferometer 403, the distance between the grating coupler 401 and the multi-mode interferometer 403 increases. An increase in the distance between the grating coupler 401 and the multi-mode interferometer 403 raises the need to increase the length of the waveguide 404 inserted between the input/output ports on the branched side of the multi-mode interferometer 403. Therefore, the characterization-target device element is preferably placed in a path between the input/output ports on the branched side of the multi-mode interferometer 403.

Figure 6:
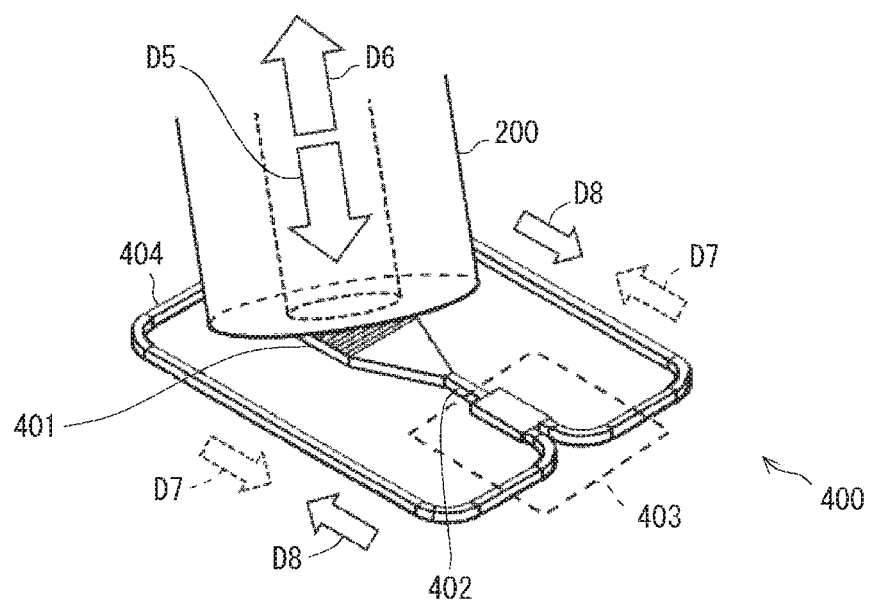
FIG. 6 is a perspective view showing the state where an optical fiber is optically coupled to the optical element according to the second embodiment of the present disclosure.

FIG. 6 shows the state where an optical fiber 200 is optically coupled to the optical element 400 according to the second embodiment. As shown in FIG. 6, in the optical element 400 according to the second embodiment also, the optical fiber 200 is optically coupled to the optical element 400 in the same manner as in the optical element 100 according to the first embodiment.

The operation of the optical element 400 is described hereinafter with reference to FIG. 6. Light that has propagated through the optical fiber 200 in a direction D5 is output from the end face of the optical fiber 200 and input to the grating coupler 401. The input light is diffracted by grating of the grating coupler 401 and input to the waveguide 402, and then input to the multi-mode interferometer 403. The multi-mode interferometer 403 operates as a beam splitter, and splits the input light into light beams of the same power. The two split light beams are input to the waveguide 404 in opposite directions to each other. One light beam propagates through the waveguide 404 in a direction D7, and the other light beam propagates through the waveguide 404 in a direction D8. The two propagation light beams that have propagated through the waveguide 404 return to the multi-mode interferometer 403. The multi-mode interferometer 403 performs an operation that is inverse to the beam splitter and thereby serves as an optical beam combiner. The light beam combined by the multi-mode interferometer 403 propagates through the waveguide 402 and is input to the grating coupler 401. The grating coupler 401 diffracts this light and outputs it upward, so that the light is input to the optical fiber 200. The light input to the optical fiber 200 propagates in a direction D6.

Therefore, in the second embodiment also, like in the first embodiment, the light that propagates through the optical fiber 200 in the direction D5 is light to be input to the optical element 400, and the light that propagates through the optical fiber 200 in the direction D6 is light output from the optical element 400. In addition, a probe of an external optical system required to measure the optical element 400 is only the optical fiber 200. This allows the optical fiber 200 to be more easily aligned with the grating coupler 401 of the optical element 400. The same effects as in the optical element 100 according to the first embodiment are thereby obtained also in the optical element 400 according to the second embodiment.

An example 3 using the optical element 400 according to the second embodiment is described hereinafter with reference to FIG. 7. An optical element 400A shown in FIG. 7A and an optical element 400B shown in FIG. 7B are different only in the length of a waveguide 404A and a waveguide 404B. Thus, by performing measurement on the optical element 400A and the optical element 400B under the same measurement conditions and calculating a difference between these two measurement results (reflection spectrums), it is possible to obtain the transmission spectrum corresponding to the difference between the waveguide 404A and the waveguide 404B. Note that it is not necessary to divide the difference between the measurement results (reflection spectrums) by 2, which is different from the example 1 of the first embodiment.

Figure 7A:
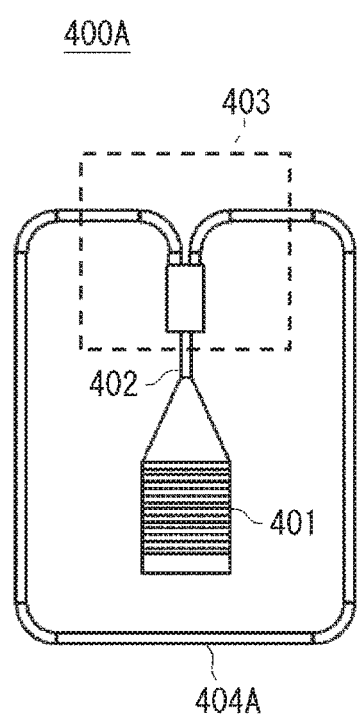
FIG. 7A is a plan view illustrating an example 3 using the optical element according to the second embodiment of the present disclosure.
Figure 7B:
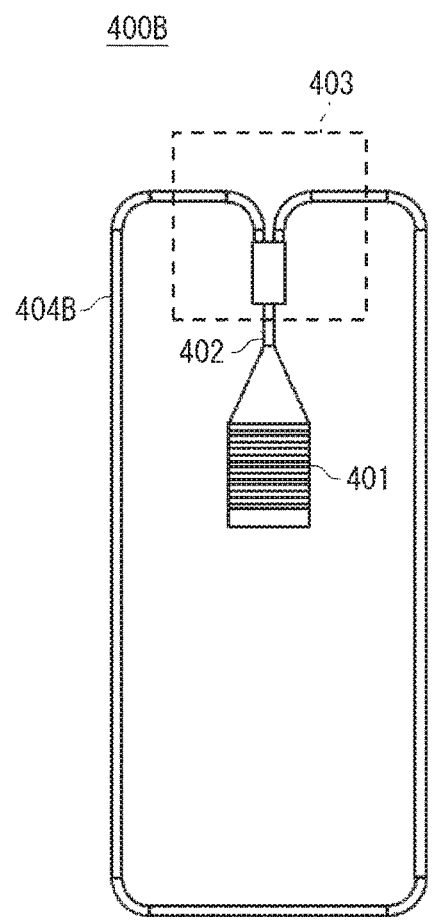
FIG. 7B is a plan view illustrating an example 3 using the optical element according to the second embodiment of the present disclosure.

In measurement using the optical elements 400A and 400B shown in FIGS. 7A and 7B, the characterization-target device element is the waveguide 404. In this measurement, a combination of the multi-mode interferometer 403 as the beam splitter and the waveguide 404A included in the optical element 400A and a combination of the multi-mode interferometer 403 as the beam splitter and the waveguide 404B included in the optical element 400B do not merely operate as a reflector. This is more easily understandable in an example 4 where the characterization-target device element is a device element other than the waveguide 404, which is described hereinbelow.

Figure 8A:
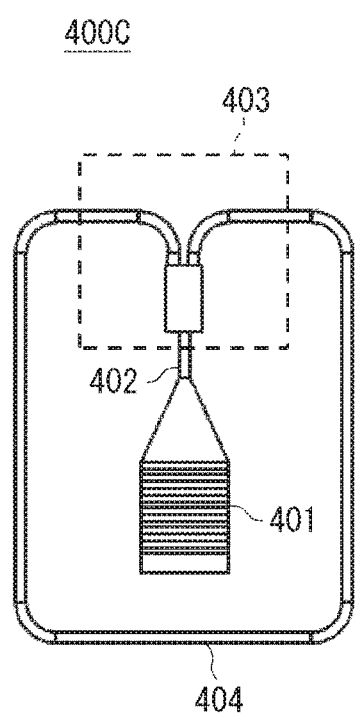
FIG. 8A is a plan view illustrating an example 4 using the optical element according to the second embodiment of the present disclosure.
Figure 8B:
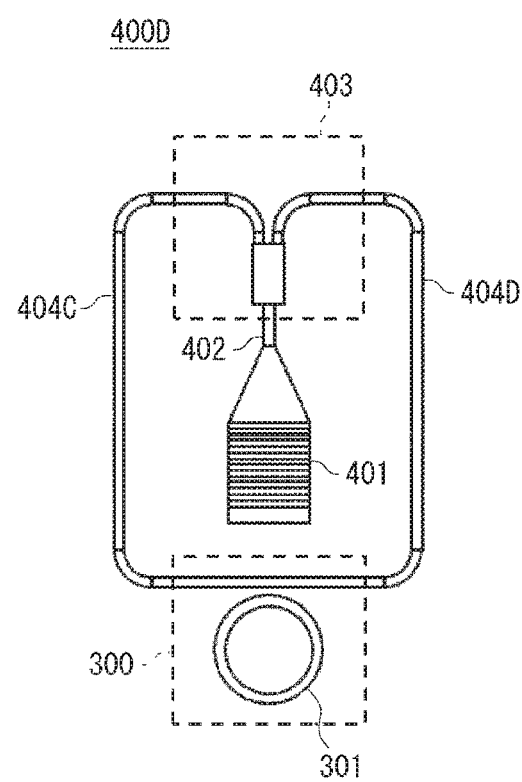
FIG. 8B is a plan view illustrating an example 4 using the optical element according to the second embodiment of the present disclosure.

The example 4 using the optical element 400 according to the second embodiment is described hereinafter with reference to FIG. 8. The length of a waveguide 404 of an optical element 400C shown in FIG. 8A and the total length of a waveguide 404C and a waveguide 404D of an optical element 400D shown in FIG. 8B are equal. On the other hand, a ring waveguide 301 is placed in close proximity to the waveguides 404C and 404D of the optical element 400D. The ring waveguide 301 and the waveguides 404C and 404D form a ring resonator 300 as the optical circuit. Note that, in FIG. 8B, the waveguide 404C is a left-half waveguide with respect to the closest point to the ring waveguide 301, and the waveguide 404D is a right-half waveguide with respect to this closest point. Therefore, the optical characteristics of the ring resonators 300 can be obtained by performing measurement on the optical element 400C and the optical element 400D under the same measurement conditions and calculating a difference between these two measurement results. Note that it is not necessary to divide the difference between measurement results by 2, which is different from the example 2 of the first embodiment.

The operation of the optical element 400D is described hereinafter with reference to FIG. 8B. When light is input from an optical fiber to the grating coupler (optical coupler) 401 of the optical element 400D, this light is split into light beams of the same power by the multi-mode interferometer (beam splitter) 403. Then, the respective light beams are sent to the waveguide 404C and the waveguide 404D. The light sent to the waveguide 404C propagates through this waveguide 404C, is input to the left input/output port of the ring resonator 300, output from the right input/output port of the ring resonator 300, and then sent to the waveguide 404D. After that, this light propagates through the waveguide 404D and returns to the right port of the multi-mode interferometer 403. Thus, the light propagates through the closed-loop optical circuit of the optical element 400D in the counterclockwise direction. On the other hand, the light sent to the waveguide 404D from the multi-mode interferometer 403 propagates through this waveguide 404D, is input to the right input/output port of the ring resonator 300, output from the left input/output port of the ring resonator 300, and then sent to the waveguide 404C. After that, this light propagates through the waveguide 404C and returns to the left port of the multi-mode interferometer 403. Thus, the light propagates through the closed-loop optical circuit of the optical element 400D in the clockwise direction.

Then, the multi-mode interferometer 403 operates as the beam combiner that combines the light that has propagated through the closed-loop optical circuit of the optical element 400D in the counterclockwise direction and the light that has propagated through the closed-loop optical circuit of the optical element 400D in the clockwise direction. The multi-mode interferometer 403 then sends the combined light to the waveguide 402. After that, this light is input to the grating coupler 401. The grating coupler 401 diffracts the input light and outputs it. Thus, the light output from the grating coupler 401 is received by the optical fiber that has input the light to the grating coupler 401 as reflected return light from the optical element 400D.

Therefore, light beams of the same optical power are input to the ring resonator 300, which is the characterization-target device element included in the optical element 400D, in two opposite directions. However, the optical power of the light beams is half the optical power of the light received by the grating coupler 401. If the waveguide 404C and the waveguide 404D are of single mode for light with polarization to be measured, or the waveguides at the two input/output ports of the ring resonator 300, which is the characterization-target device element, are of single mode, the transmittance of the ring resonator 300 does not depend on the light input direction by the reciprocity theorem. Thus, the transmitted light intensity of the ring resonator 300 also does not depend on the light input direction. Therefore, the optical powers of the two light beams returning to the multi-mode interferometer 403, which is the beam splitter (beam combiner), are the same. Because the respective light beams propagate through exactly the same optical circuit in opposite directions, the phase changes of the light beams, when the light beams have propagated in the counterclockwise direction and in the clockwise direction and returned to the multi-mode interferometer 403, are also exactly the same. As a result, the multi-mode interferometer 403 combines two light beams in the reverse operation to beam splitting and sends the light to the grating coupler 401, which is an optical coupler.

As described above, the principle of operation of the examples 3 and 4 is totally different from the principle of operation of the examples 1 and 2 described earlier. In the examples 3 and 4 also, light passes through the characterization-target device element in two directions and operates based on the reciprocity theorem, which is the same as in the examples 1 and 2 and different from the operation of the optical element 500 shown in FIG. 10. However, while the power of light that passes through the characterization-target device element is the same as the power of light input to the grating coupler 401 in the examples 1 and 2, it is half the power of light input to the grating coupler 401 in the examples 3 and 4. Therefore, a method of processing measured values is different between the examples 1 and 2 and the examples 3 and 4. Specifically, in the examples 3 and 4, there is no need to divide a measured value in dB, and a measuring instrument to be used does not need to have a double dynamic range.

Furthermore, the radius of curvature of the waveguide 104 is small in the optical element 100 according to the first embodiment shown in FIG. 1. In the case of using a thin waveguide with a silicon core, a waveguide curved at a small radius does not, generally, cause any problem. On the other hand, there is a type of waveguide that needs to have a large radius of curvature in order to sufficiently reduce the propagation loss of the curved waveguide. Examples are a waveguide with low light confinement such as a rib waveguide, a curved waveguide with less dimensional accuracy due to low lithography accuracy and the like. In such cases, it is necessary to increase the radius of a curved waveguide, which enlarges the loop of the waveguide 104 between the two input/output ports on the branched side of the beam splitter, and thereby the inner space of the waveguide loop becomes uselessly large. A decrease in the degree of integration is a non-negligible issue for optical integrated chips, which are expected to become more high density in the future. Therefore, there is a demand for an optical element that is still smaller in size.

Furthermore, in the first embodiment, values in dB of the transmittance and the optical loss obtained by measuring the optical element 100 need to be divided by 2. In other words, the transmittance and the optical loss directly observed by a measuring instrument are values that are double the actual characteristics of the optical element 100. Therefore, the following problem can occur in a characterization-target device element that is other than a simple waveguide, such as the optical element 100D in the example 2 of the first embodiment shown in FIG. 4B, for example.

Figure 9:
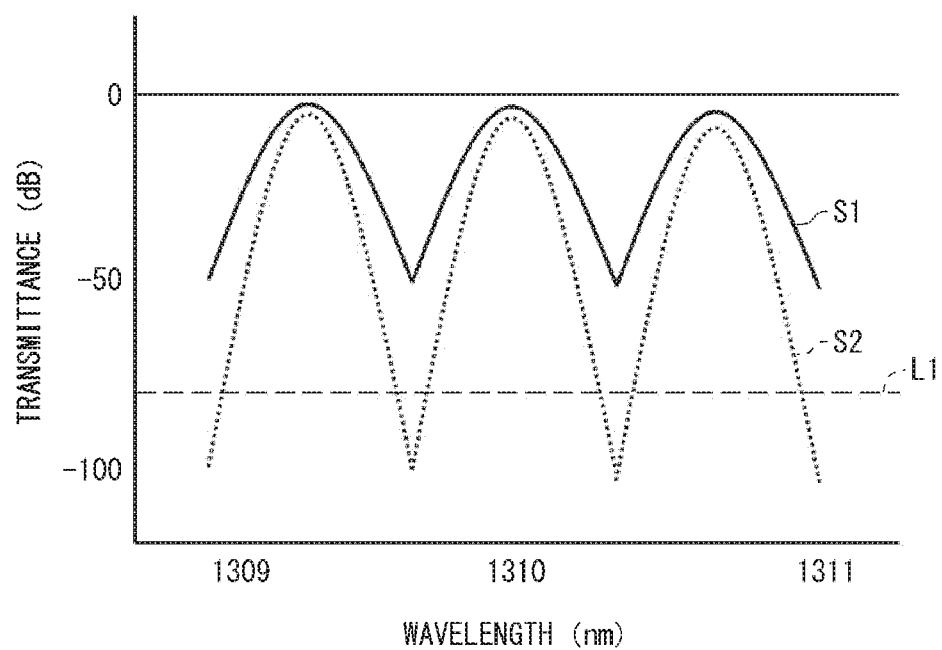
FIG. 9 is a graph showing an example of a transmission spectrum of a ring resonator.

FIG. 9 schematically shows an example of the transmission spectrum of the ring resonator 300. It is assumed that a certain ring resonator 300 has the transmission spectrum in dB as indicated by the solid line S1 in FIG. 9. Specifically, it is assumed that the ring resonator 300 has the transmission spectrum where the transmittance significantly decreases at wavelengths other than specific wavelengths. When the characteristics of the ring resonator 300 are measured by using the optical elements 100C and 100D in the example 2 of the first embodiment, a measuring instrument receives the transmission spectrum in dB as indicated by the dashed line S2 in FIG. 9. To be specific, in the case of using the optical elements 100C and 100D in the example 2, the lowest optical power received by a measuring instrument is half the actual lowest power of the ring resonator 300 in dB. For example, when this ring resonator 300 exhibits the lowest transmittance −40 dB at a certain wavelength, the lowest optical power received by a measuring instrument is as small as −80 dB for the input optical power in the case of using the optical elements 100C and 100D in the example 2. Other optical losses are ignored in this example. As a result, depending on the capability of the measuring instrument used, there is a possibility that this lowest received optical power falls below the sensitivity (the dashed line L1 in FIG. 9) of the measuring instrument. When the lowest optical power received by the measuring instrument falls below the sensitivity of this measuring instrument, it is not possible to accurately evaluate the transmission spectrum of the ring resonator 300. Therefore, in the case of using the optical element 100 according to the first embodiment, it is required to use a measuring instrument with a large difference between the maximum receivable optical power and the minimum receivable optical power, that is with a large dynamic range.

On the other hand, in the case of using the optical element 400 according to the second embodiment, the optical power of light received by a measuring instrument is the same as the optical power of light that has been transmitted through the characterization-target device element as described above, and there is no need for a measuring instrument to have a double dynamic range.

In the optical element 400 according to the second embodiment described above, because the grating coupler 401 is placed inside the closed loop optical circuit composed of the multi-mode interferometer 403 and the waveguide 404, it is possible to reduce a space required for the optical element 400 and thereby enhance the use efficiency of the space on a photonic chip, in addition to obtaining the same effects as in the optical element 100 according to the first embodiment. Furthermore, in the case of using the optical element 400 according to the second embodiment, because the power received by a measuring instrument is the same as the power of light that has transmitted through the characterization-target device element, the measuring instrument does not need to have an unnecessarily large dynamic range.

It should be noted that the present disclosure is not limited to the above-described embodiments and may be varied in many ways within the scope of the present disclosure. For example, the optical coupler is not limited to the grating coupler, and it may be an optical coupler using a mirror or an end-coupling type optical coupler. However, with use of the grating coupler as the optical coupler, it is possible to easily manufacture the optical element and perform measurement in wafer level before dicing.

Furthermore, the beam splitter (beam combiner) is also not limited to the multi-mode interferometer, and it may be a simple Y-branch waveguide or directional coupler. Generally speaking, however, manufacturing errors of a multi-mode interferometer less affect the branching ratio of the optical power than a Y-branch waveguide or a directional coupler.

Furthermore, the material of each part of the optical element is also not particularly limited, and it may be a compound semiconductor, resin, glass or the like, other than silicon. Note that, when the optical element includes a waveguide made of resin or glass, the optical element preferably has the structure of the optical element according to the second embodiment because the light confinement of the waveguide made of resin or glass is generally low.

According to the present disclosure, it is possible to provide an optical element that can be more easily aligned with an optical fiber.

The first and second embodiments can be combined as desired by a person of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An optical element comprising:
an optical coupler;
a first waveguide connected to the optical coupler;
an optical circuit including at least two input/output ports, the optical circuit being connected to an end of the first waveguide opposite to an end thereof to which the optical coupler is connected;
a second waveguide connected to one of the input/output ports of the optical circuit different from the other one of the input/output ports connected to the first waveguide;
a beam splitter connected to an end of the second waveguide opposite to an end thereof to which the optical circuit is connected; and
a third waveguide configured to be inserted between two input/output ports disposed on a branched side of the beam splitter, and
wherein the optical circuit includes a ring resonator, the ring resonator being positioned between the optical coupler and the beam splitter.

2. The optical element according to claim 1, wherein the first waveguide and the second waveguide are single-mode waveguides, or the first waveguide, the optical circuit and the second waveguide are single-mode waveguides.

3. The optical element according to claim 1, wherein the optical coupler is a grating coupler.

4. The optical element according to claim 1, wherein the beam splitter is a 1-input 2-output multimode interferometer.

5. An optical element comprising:
an optical coupler;
a first waveguide connected to the optical coupler;
a beam splitter connected to an end of the first waveguide opposite to an end thereof to which the optical coupler is connected;
a second waveguide connected to one of two input/output ports disposed on a branched side of the beam splitter;
a third waveguide connected to the other one of the two input/output ports disposed on the branched side of the beam splitter; and
an optical circuit configured to be inserted between the second waveguide and the third waveguide and include at least two input/output ports,
wherein an end of the second waveguide opposite to an end thereof to which the beam splitter is connected is connected to one of the input/output ports of the optical circuit, and an end of the third waveguide opposite to an end thereof to which the beam splitter is connected is connected to the other one of the input/output ports of the optical circuit different from the input/output port connected to the second waveguide, and wherein the optical coupler is placed inside a closed loop formed by the beam splitter, the second waveguide, the third waveguide, and the optical circuit.

6. The optical element according to claim 5, wherein the second waveguide and the third waveguide are single-mode waveguides, or the second waveguide, the optical circuit and the third waveguide are single-mode waveguides.

7. The optical element according to claim 5, wherein the optical circuit includes a ring resonator.

* * * * *